Figure 1:
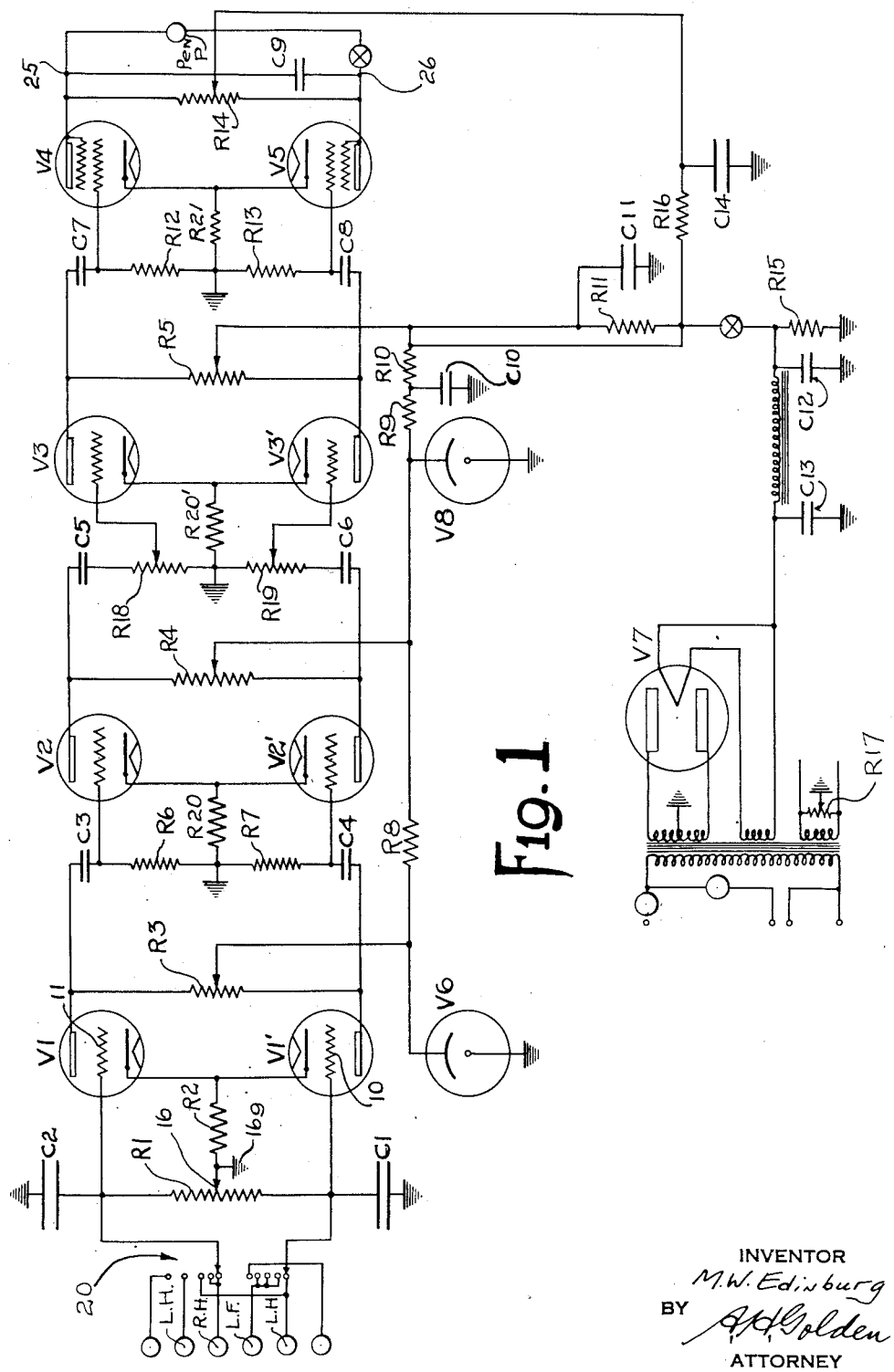

Oct. 16, 1951 M. W. EDINBURG 2,571,223
ELECTROCARDIOGRAPH
Filed Aug. 23, 1946 2 Sheets-Sheet 1

INVENTOR
M.W. Edinburg
BY
A.H.Golden
ATTORNEY

Oct. 16, 1951     M. W. EDINBURG     2,571,223
ELECTROCARDIOGRAPH

Filed Aug. 23, 1946     2 Sheets-Sheet 2

INVENTOR
M. W. Edinburg
BY
ATTORNEY

UNITED STATES PATENT OFFICE 2,571,223

ELECTROCARDIOGRAPH

Murray W. Edinburg, Worcester, Mass.

Application August 23, 1946, Serial No. 692,717

12 Claims. (Cl. 128—2.06)

This invention relates to an electrocardiograph for yielding a visual indication of a feeble body developed current.

Electrocardiographs have been known for many years, having first been demonstrated in connection with a string galvanometer. Thereafter, machines of the string galvanometer type were displaced by recorders employing vacuum tubes for amplifying the feeble heart currents, the amplified currents being utilized for rotating a coil that in turn moves a mirror. The mirror is utilized for reflecting a beam of light onto a light sensitive film, and thereby yielding a record of the heart current as amplified.

It is obvious that there are many features of this type of machine that are extremely unsatisfactory. Thus, it is necessary to utilize a light sensitive film that is available to the diagnosing physician only after being developed, and not until it is developed does the physician know whether or not he has made an acceptable graph. Moreover, considerable skill is required in the utilization of the apparatus, and it is cumbersome and difficult to transport.

Because of these disadvantages of photographic electrocardiographs, inventors have attempted to develop an electrocardiograph having a direct recording pen moved by the amplified current of the circuit on which are impressed the feeble body voltages. In the development of this type of instrument, it has been found that unwanted potentials from extraneous sources are received by the human body and transmitted through the electrodes to the amplifying circuit. When amplified with the wanted voltages to the degree required because of the power needed to actuate the recording pen, these extraneous unwanted potentials affect greatly the movement of the recording pen, with the result that the recording is unsatisfactory in many respects, and is extremely difficult to read. Considerable work has been done by others in this art toward eliminating these unwanted potentials and thereby obtaining a commercially desirable machine. However, so far as I know, no completely successful and commercially desirable electrocardiograph of the direct inking type has been produced.

It is the object of my invention to contribute a direct inking electrocardiograph adapted to yield a simple thin line recording of the wanted feeble body voltages as amplified, eliminating the unwanted voltages that, unless eliminated, will distort the normal graph.

I have found it possible to eliminate from the graph the effects of the unwanted potentials or extraneous voltages through differentiating those voltages from the wanted voltages developed within the body. In this connection, I have taken into consideration the fact that the unwanted voltages are derived from grounded sources and are always in the same phase, while the feeble body currents are developed within the ungrounded body and are always out of phase or anti-phase. When a pair of electrodes leading from two parts of the body are placed in contact with the grids of the opposed first stage tubes of a push pull amplifier circuit, since the impedances from each grid to the cathode are equal, therefore the input potential from desired signals tends to become equally divided between the two grids, with one grid always becoming more positive with respect to the common cathode as the other grid is becoming more negative. Thus, the wanted voltages, appearing at the grids of a push-pull amplifier have come to be called anti-phase signals, since the signals at the two grids are always out of phase with respect to the cathode. One of the virtues of the push-pull amplifier is that the division of the anti-phase or desired signal between the two grids need not be equal. In fact, either grid may be grounded without affecting the total amplification or the output of the amplifier, provided that the amplifier is push-pull throughout, and that the recording device is responsive to the potential difference in the output circuit, without respect to the ground potential. It naturally follows that the difference in potential between the plate currents of the last stage of amplification of the amplifier will correspond to the difference in potential between the two electrodes and grids. It is in this last stage that I place my recording pen.

At the same time, the unwanted potentials will each be impressed on the first stage grids and in the same phase, with the resulting amplification by each side of the push pull amplifier circuit being in proportion to the difference of potential between each grid and the ground. As will hereafter be further emphasized, the unwanted inphase extraneous voltages are generally unequal, and will therefore greatly affect the final recording. By the adjustment, preferably, of a common ground connection extending from a potentiometer between the grids, the potential difference between each grid and the ground may be so adjusted that the resulting amplification will effect a balancing within the circuit of the effects of the unwanted voltages on the opposed grids.

This adjustment is actually accomplished by me merely through a visual perception of the effects of the unwanted inphase voltages on the amplifying circuit, and the consequent movement of the adjusting means to balance within the amplifying circuit the effects of the unwanted voltages.

I have thus outlined the general nature of my invention and its relation to the prior art in order that the description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based, may readily be utilized as the basis for the designing of other structures for carrying out the several purposes of my invention.

Figures 2, 3:
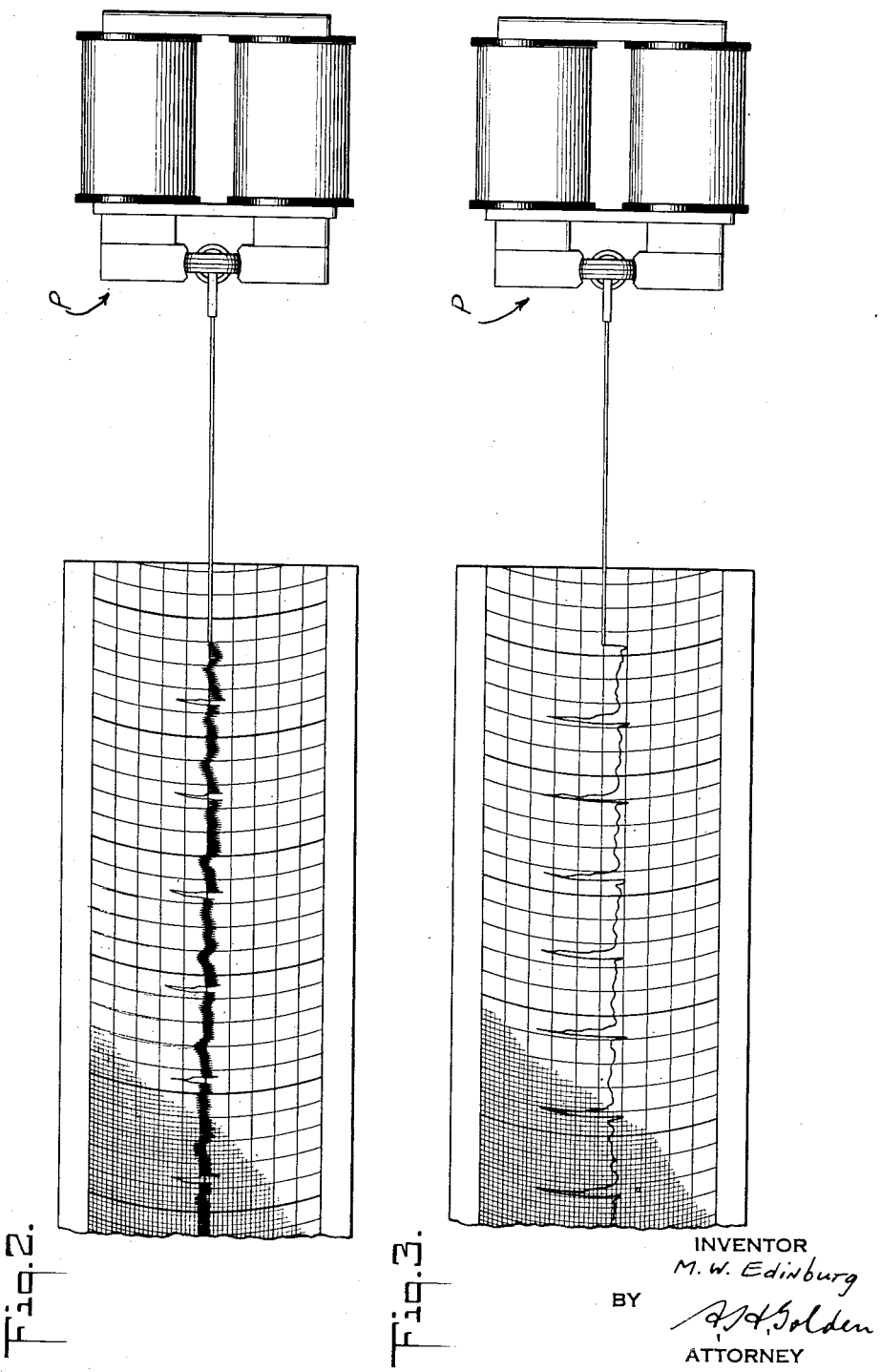

Referring now to the drawings, Fig. 1 is a diagrammatic view of the circuit of my invention. Fig. 2 is a view showing the pen of my invention and the type of graph it would yield in the usual type of electrocardiograph utilizing a direct inking recorder. Fig. 3 illustrates the pen of my invention and the type of graph yielded thereby through the utilization of my invention.

Referring now more particularly to the drawings, I show therein a push pull amplifying circuit utilizing a series of vacuum tubes functioning as amplifiers, rectifiers, voltage regulators, etc. In order that those skilled in the art may practice the invention herein set forth, the tubes of my invention are cataloged as follows, the reference numerals below shown being the reference numerals applied in the drawing to the several tubes, while the catalog numbers are the commercial numbers well known in the trade:

| Reference Numeral | Catalog Number |
|---|---|
| V1 | 6SC7. |
| V1' | 6SC7. |
| V2 | 6SC7. |
| V2' | 6SC7. |
| V3 | 6SC7. |
| V3' | 6SC7. |
| V4 | 6V6. |
| V5 | 6V6. |
| V6 | VR75/30. |
| V7 | VR90/30. |
| V8 | 5V4. |

The condensers of the circuit are designated by reference numerals of the series beginning "C" and their capacities are as follows:

| Reference Numeral | Capacity |
|---|---|
|  | Microfarads |
| C1 | .5 |
| C2 | .5 |
| C3 | 1 |
| C4 | 1 |
| C5 | 1 |
| C6 | 1 |
| C7 | 1 |
| C8 | 1 |
| C9 | 2 |
| C10 | 40 |
| C11 | 40 |
| C12 | 16 |
| C13 | 16 |
| C14 | 40 |

The resistors of my amplifying circuit are designated by reference numerals of the series beginning with "R" and are cataloged as follows:

| Reference Numeral | Catalog Number |
|---|---|
| R1 | 10,000 ohms. |
| R2 | 1,500 ohms. |
| R3 | 5 megohm potentiometer. |
| R4 | ½ megohm potentiometer. |
| R5 | Do. |
| R6 | 1 megohm. |
| R7 | Do. |
| R8 | 3,500 ohms. |
| R9 | Do. |
| R10 | 6,000 ohms. |
| R11 | 25,000 ohms. |
| R12 | 500,000 ohms. |
| R13 | Do. |
| R14 | 1,000 ohms. |
| R15 | 25,000 ohms. |
| R16 | 3,500 ohms. |
| R17 | 50 ohms. |
| R18 | Double ½ megohm potentiometer. |
| R19 | Do. |
| R20 | 1,500 ohms. |
| R20' | Do. |
| R21 | Do. |

Through a series of jacks and switches at 20, it is possible to impress on the grid 10 and on the grid 11 of tubes V1' and V1 respectively, the voltage differential between any two parts of the body, as for example, between the left hand (LH) and the right hand (RH). As a result of the amplification of the resulting feeble body current, the pen P will move to yield a line graph in accordance with the difference in potential at various stages between the left hand and the right hand, all as those skilled in the art will fully appreciate. Unfortunately, unwanted or extraneous potentials will impress themselves on the basic wanted potential, and will be amplified therewith and affect the operation of the pen, thus yielding a distorted graph. As I have already indicated generally, it is the object of my invention to eliminate the effect of these extraneous voltages on the operation of the pen so as to obtain a thin line recording of the simple basic heart action voltage as amplified by my circuit.

As I have explained, I have found that the extraneous voltages developed between one body electrode, as for example, the left hand electrode and the ground, will always be in the same phase as the voltage developed between another body electrode, as the right hand and the ground, although generally of different potential. The amplitude of these extraneous voltages depends on the relative electrostatic capacity between the tissues of the patient and the effective sources of the potential gradient, and on the impedances which connect the patient to one side of the potential gradient (ground) through the amplifier input circuit. Thus, if the patient is in a fluctuating electrostatic field, and is connected by two electrodes to the input grids of a push-pull amplifier, the two grids will always be changing potential with respect to ground because of the application of the inphase unwanted extraneous voltages, but both grids will always change in the same direction at the same time. Thus the extraneous voltages, with the potentials going up up and down together, are inphase potentials because they cause the grids to become more positive or more negative simultaneously. In a push-pull amplifier, the inphase potentials will cause no potential difference between the grids and therefore will cause no potential difference in the output circuit if these inphase potentials are equal at the input and are equally amplified by each side of the amplifier. In other words, as long as the unwanted potentials are still equal with respect to the ground at the output of the amplifier, their effect will cancel, and no record of their wave form will appear in the output of the recording system.

If the impedance of the tissue of a patient to which eelctrodes are connected were zero, the inphase or extraneous voltages would necessarily be equal at the two electrodes with respect to the ground system. In that ideal case, the push-pull amplifier as it is usually constructed would indeed not have any voltage of the extraneous frequency appearing in its recorded output.

Practically, however, when the patient is in a strong electrostatic field, there is a small but finite voltage, often amounting to several millivolts, between electrodes on the patient's body, which in electrocardiography, may be several feet apart. This voltage difference can exist because the impedance between the electrodes is not zero, but a minimum of several thousand ohms.

Therefore, it may be said that inphase extraneous voltages at the input grids under practical operating conditions are not equal with respect to the ground, and the deviation from equality will vary with the strength of the interference field, the position of the patient's body, and the impedance between electrodes. If the usual push-pull amplifier is used to amplify the wanted body voltages, this difference in potential at the two grids of the extraneous voltages will be amplified and will appear in the output record along with the desired amplified true wanted voltage from the patient's muscle currents. It is the effect of these inphase extraneous voltages in the electrocardiograph that I seek to eliminate, while recording simultaneously the ungrounded but wanted true voltage of the feeble body current.

For my purposes, I position between the grids 10 and 11 of the tubes of the first stage of amplification, a potentiometer having a total resistance of 10,000 ohms, and supply therefor a sliding contact 16 grounded at 16g. The opposed ends of the actuating coil of the recording pen P are themselves placed between terminals 25 and 26 of the plate circuits of the final tubes V4 and V5 of the last amplification stage. Because of this positioning of the pen P, it is evident that the action of the pen does not depend necessarily on the change of potential between the plate and ground of each final tube V4, V5. Rather, the action of the pen will depend on the voltage differential between the plate circuits of the final tubes. It follows therefore, that the action of the pen will depend on the difference of the voltage impressed between grids 10 and 11, and not necessarily on the potential differential between grid 10 and the ground, and between the grid 11 and the ground. This is of exceeding importance.

As I have already indicated, the unwanted inphase extraneous voltages will be impressed on grids 10 and 11, and will be from grounded sources. If these extraneous unwanted potentials are to be eliminated effectively in my push-pull amplifier, they must be exactly equal between each grid and the ground. It is evident that the potential of these unwanted voltages appearing at the grids of the tubes VI and VI', can be balanced through a variation of the voltage differential between each grid 10, 11 and the ground. This is done by moving the potentiometer slide 16 relatively to the potentiometer R1 and acts to equalize the effects of the extraneous inphase potentials on the grids 10, 11. Actually, the effect will be the same as though the inphase unwanted voltages were equal, as earlier discussed.

In this way, the final amplified current applied to the pen P will have balanced from it any effect of the unwanted voltages on the grids 10 and 11. While I choose to accomplish this balancing in the first stage of amplification, it can be accomplished elsewhere in the circuit. Moreover, the balancing may be effected in other ways as will occur to those skilled in the art.

As already set forth generally, the wanted voltages are not grounded, and their effects on the amplifying circuit will be in accordance with the difference of potential between the grids 10 and 11. The wanted voltages appear as a fluctuating potential difference between the two grids, and have no inherent relation to the potential of the cathode or ground potential of the system. Because these wanted voltages are out of phase relatively to the inphase unwanted voltages, it is possible to manipulate the slide 16 manually while watching the operation of the pen P, and gradually balancing out the unwanted voltages as above set forth so that the final recording will be of the type shown in Fig. 3; that is, a simple line such as those skilled in the art will appreciate represents a true feeble body current. In Fig. 2 there is illustrated the type of recording that is yielded when the unwanted voltages are not balanced and are allowed to affect the operation of the pen. It is readily apparent just how different is the recording in Figs. 2 and 3 and therefore how very simple it is for even the most inexperienced person to manipulate the circuit amplification control to change the type of recording from that of Fig. 2 to that of Fig. 3.

I believe that those skilled in the art will now appreciate the considerable contribution of this invention and the operation thereof.

I now claim:

1. The method of obtaining an amplified indication of a feeble body current developed between electrodes leading from two parts of the body, that comprises impressing the current from said electrodes on the grids of the first stage tubes of a push pull amplifying circuit, and adjusting the said circuit manually to effect a balancing within the said amplifying circuit of unequal extraneous voltages leading in the same phase from the body electrodes to the said grids.

2. The method of obtaining an amplified indication of a feeble body current developed between electrodes leading from two parts of the body, that comprises impressing the current from said electrodes on the grids of the two tubes comprising the first stage of an amplifier, impressing the amplified current on the opposed ends of a moving recording coil, and adjusting the amplifying circuit to effect a balancing within the said amplifier of unequal extraneous voltages leading in the same phase from the body electrodes to the grids of said two tubes.

3. The method of obtaining an amplified indication of a feeble body current developed between electrodes leading from two parts of the body and subjected to certain unwanted inphase extraneous voltages, that comprises impressing the current from said electrodes on the grids of the first stage tubes of a push pull amplifying circuit in such manner that the voltage differential between the two grids is the voltage differential between the two electrodes of the said feeble body current, presenting a variable resistance to the ground path of said inphase extraneous voltages extending from said electrodes to said grids, and adjusting said variable resistance to vary the differential potential between each grid and the ground so that the said inphase extraneous voltages will be balanced within the amplifying system to offset one another.

4. Apparatus for obtaining an amplified indication of a feeble body current developed between electrodes leading from two parts of a body, comprising a push pull amplifying circuit, a movable coil for actuating a recorder, indicator, or the like, means whereby the opposed output terminals of said amplifying circuit are in contact with the opposed ends of said movable coil, the grids of the opposed first stage tubes of said amplifying circuit being in contact with the said electrodes, a resistance having a variable ground connection positioned between the grids of a pair of opposed tubes of said amplifying circuit in the same stage of amplification, and means for adjusting said variable ground connection whereby to balance thereby the effects of the inphase extraneous currents running from the said electrodes.

5. Apparatus for obtaining an amplified indication of a feeble body current developed between electrodes leading from two parts of a body, comprising a push pull amplifying circuit, a movable coil for actuating a recorder, indicator, or the like, means whereby the opposed output terminals of said amplifying circuit are in contact with the opposed ends of said movable coil, the grids of the opposed first stage tubes of said amplifying circuit being in contact with the said electrodes, a resistance positioned between the grids of the said first stage of amplification of said circuit and having a variable ground connection whereby to vary the potential between either grid and the ground while leaving undisturbed the differential potential between the said grids, whereby the varying of the ground connection position will balance out extraneous unwanted voltages from grounded sources impressed through said electrodes on said grids while amplifying the wanted body developed voltage differential impressed on said grids.

6. Apparatus for obtaining an amplified indication of a feeble body current developed between electrodes leading from two parts of a body, comprising a push pull amplifying circuit, a movable coil for actuating a recorder, indicator, or the like, means whereby the opposed output terminals of said amplifying circuit are in contact with the opposed ends of said movable coil, the grids of the opposed first stage tubes of said amplifying circuit being in contact with the said electrodes, and means for balancing within the said amplifying circuit the unequal extraneous inphase voltages from grounded sources leading from said electrodes while the out of phase wanted ungrounded body voltages are amplified.

7. The method of obtaining an amplified indication of a feeble body current developed between electrodes leading from two parts of the body and subjected to certain unwanted inphase extraneous voltages, that comprises impressing the current from said electrodes on the grids of the first stage tubes of a push pull amplifying circuit in such manner that the voltage differential between the two grids is the voltage differential between the two electrodes of the said feeble body current, placing the coil of a recorder across the last stage of amplification of said circuit, presenting a variable resistance to the ground path of said inphase extraneous voltages extending from said electrodes to said grids, and adjusting said variable resistance to vary the differential potential between each grid and the ground merely through visual perception of the movement of the recorder, so that the said inphase extraneous voltages will be balanced within the amplifying system to offset one another and thereby not affect the movement of the recorder in response to the amplified wanted body currents.

8. The method of obtaining an amplified indication of a feeble body current developed between electrodes leading from two parts of the body and subjected to certain unwanted inphase extraneous voltages, that comprises impressing the current from said electrodes on the grids of the first stage tubes of a push pull amplifying circuit, and equalizing the potential differential between each grid and the ground of the extraneous voltages leading in the same phase from the body electrodes to the said grids.

9. The method of obtaining an amplified indication of a feeble body current developed between electrodes leading from two parts of the body and subjected to certain unwanted inphase extraneous voltages, that comprises impressing the current from said electrodes on the grids of the first stage tubes of a push pull amplifying circuit in such manner that the voltage differential between the two grids is the voltage differential between the two electrodes of the said feeble body current, presenting a variable resistance to the ground path of said inphase extraneous voltages extending from said electrodes to said grids, and adjusting said variable resistance to equalize the potential differential between each grid and the ground of the inphase extraneous voltages impressed on said grids.

10. The method of obtaining an amplified indication of a feeble body current developed between electrodes leading from two parts of the body and subjected to certain unwanted inphase extraneous voltages, that comprises impressing the current from said electrodes on the grids of the first stage tubes of a push pull amplifying circuit in such manner that the voltage differential between the two grids is the voltage differential between the two electrodes of the said feeble body current, placing the coil of a recorder across the last stage of amplification of said circuit, presenting a variable resistance to the ground path of said inphase extraneous voltages extending from said electrodes to said grids, and adjusting said variable resistance to equalize the differential potential between each grid and the ground of said extraneous voltages merely through visual perception of the movement of the recorder, so that unequal inphase extraneous voltages will be balanced within the amplifying circuit.

11. Apparatus for obtaining an amplified indication of a feeble body current developed between electrodes leading from two parts of a body and subjected to certain unwanted inphase extraneous voltages, comprising a push pull amplifying circuit, a movable coil for actuating a recorder, indicator, or the like, means whereby the opposed output terminals of said amplifying circuit are in contact with the opposed ends of said movable coil, the grids of the opposed first stage tubes of said amplifying circuit being in contact with the said electrodes, and a variable resistance between each grid and the ground adjustable for equalizing the potential differential between each grid and the ground impressed on said grids by the said extraneous inphase voltages leading from said electrodes.

12. Apparatus for obtaining an amplified indication of a feeble body current developed between electrodes leading from two parts of a body and subjected to certain unwanted inphase extraneous voltages, comprising a push pull amplifying circuit, a recorder actuated by the output of said amplifying circuit, means whereby the electrodes impress on the grids of the opposed tubes of one amplification stage of said amplifying circuit the said extraneous unwanted inphase voltages and the wanted out of phase voltages of the feeble body current, a resistance positioned between the said grids of the said stage of amplification of said circuit and having a variable ground connection whereby to vary the potential between either grid and the ground whereby to equalize the potential differential between each grid and the ground impressed on said grids by said extraneous unwanted inphase voltages.

MURRAY W. EDINBURG.

REFERENCES CITED

The following references are of record in the file of this patent:

UNITED STATES PATENTS

| Number | Name | Date |
| --- | --- | --- |
| 2,409,033 | Garceau | Oct. 8, 1946 |

OTHER REFERENCES

"Radio Engineering" by F. E. Terman, second edition, published by the McGraw-Hill Book Co., N. Y., N. Y., pages 305–306.